Nov. 3, 1970 R. G. BAUMGARTNER 3,538,236

PEDESTAL CLOSURES FOR BURIED TELEPHONE PLANT

Filed June 6, 1969 2 Sheets-Sheet 1

CANCEL per paper #4

INVENTOR
R. G. BAUMGARTNER
BY Charles E. Graves
ATTORNEY

Nov. 3, 1970 R. G. BAUMGARTNER 3,538,236

PEDESTAL CLOSURES FOR BURIED TELEPHONE PLANT

Filed June 6, 1969 2 Sheets-Sheet 2

United States Patent Office 3,538,236
Patented Nov. 3, 1970

3,538,236

PEDESTAL CLOSURES FOR BURIED TELEPHONE PLANT

Robert G. Baumgartner, Baltimore, Md., assignor to Bell Telephone Laboratories, Incorporated, Murray Hill and Berkeley Heights, N.J., a corporation of New York Filed June 6, 1969, Ser. No. 831,086
Int. Cl. H02g *9/02*
U.S. Cl. 174—38 7 Claims

ABSTRACT OF THE DISCLOSURE

This specification discloses a pedestal-type telephone cable closure consisting of a base and an upper housing of like cross section. The base is mounted on a channel which is driven into the ground separately. The cables are led in through the base bottom and supported on a bonding clamp that also contacts the cable's metallic shield. A center partition in the upper housing physically segregates the pairs to which service wire splices will be made.

FIELD AND OBJECTS OF THE INVENTION

This invention relates to pedestal-type closures used with buried telephone cable plant.

One object of the invention is to reduce the cost and complexity of connects and disconnects within a pedestal-type telephone cable closure.

A more specific object of the invention is to reduce the risk of mistake in the splicing of service drop wires to telephone pairs appearing in pedestal-type closure.

An added object of the invention is to facilitate the mounting and grounding of telephone cables within a pedestal-type closure.

An important object of the invention is to achieve the above objects in a telephone cable closure while also providing functional flexibility at a minimum of cost.

BACKGROUND OF THE INVENTION

In the inventor's Pat. 3,480,721 issued Nov. 25, 1969, Ser. No. 768,376 filed Oct. 17, 1968, there is described a pedestal-type telephone closure possessing features of practical and technical importance to the art. This closure consists of a fully closed lower housing and an upper housing of like shape and mounted onto a circumferential flange of the lower housing. A supportive stake is driven in the ground and thereafter the closure in fixedly mounted thereto. A closed vertical passage at an interior corner of the lower housing enables service wires to be added without having to remove ballasting in the closure base.

An important aspect of the invention disclosed in the aforementioned patent is its flexibility to handle entire cable splices as well as service drops in the same basic design, such being achieved with variations in the internal hardware and bracketry. One basic closure thus fulfills the functions previously handled by several specialized closure designs.

In the further development of this genus of telephone cable closure, several additional improvements have now been achieved and are the subject of the present patent application.

One such improvement relates to th manner of effecting an electrical bond between the metallic cable sheath and the ground bracket of the closure while, within the same area, also effecting the mechanical clamping of the cable to the closure. It has been realized that the inner and outer sheath clamp previously used for bonding and clamping is overly bulky, rigid, and hard to install. A clamp that grips only a segment of the cable between the sheath and outer jacketing, rather than reaching around the entire outer jacket, now is provided.

Additionally, a further feature for improving housekeeping in the closure and thereby reducing the chances of installer error has been achieved. Specifically, a partition is centrally disposed in the upper housing and serves to separate those pairs of the cable which are specified for service splices from the remainder of the pairs of a cable. A window in the partition affords a passage through which to fed a "preferred count" cable pair destined for splicing to service wire drops. The central partition thus serves to establish separate compartments for service splices and distribution splices or unspliced distribution cable pairs. Additionally, because the preferred pair count is only a small fraction of the total cable pairs, for example twenty-five pairs or less, the installer finds it easier to locate a desired pair for service splicing and is less likely to make a mistake in using existing color-coding schemes.

In one embodiment of the invention, a shield is placed over the main cable to further insure against the installer entering the wrong compartment.

The invention and its further objects, features, and advantages will be more readily apprehended from a reading of illustrative embodiments of the invention.

THE DRAWING

DETAILED DESCRIPTION OF AN ILLUSTRATIVE EMBODIMENT

Pursuant to one object of the invention, the present telephone cable closure can, with simple systematic additions to the interior hardware, function as a splicing point for distribution cable, as a terminating point for service wires, as a bridging point for a branch cable, or indeed function in all three respects concurrently. In these respects, the invention realizes objectives similar to those stated in the inventor's aforementioned Pat. 3,480,721. Its basic disclosed embodiment is hereinbelow used as a framework to demonstrate the present invention's improved structural aspects.

Figure 1:
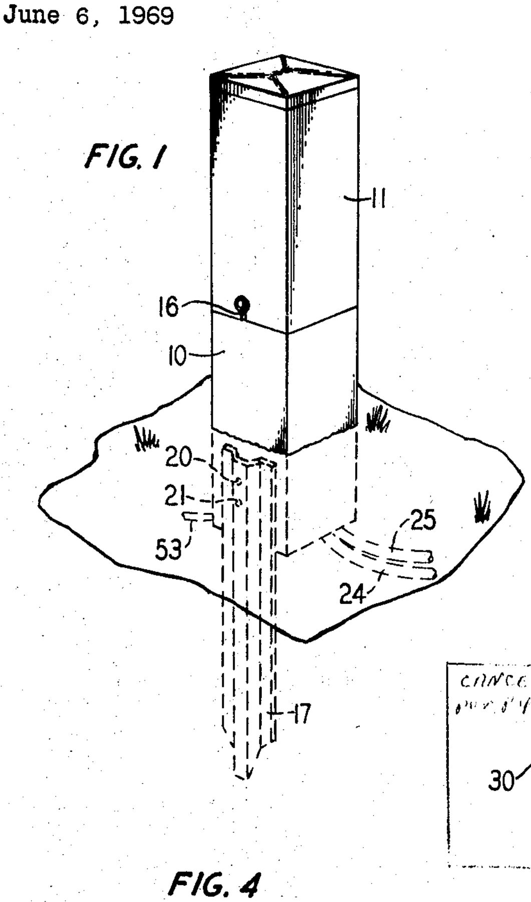
FIG. 1 is a perspective side view of an installed closure.
Figure 4:
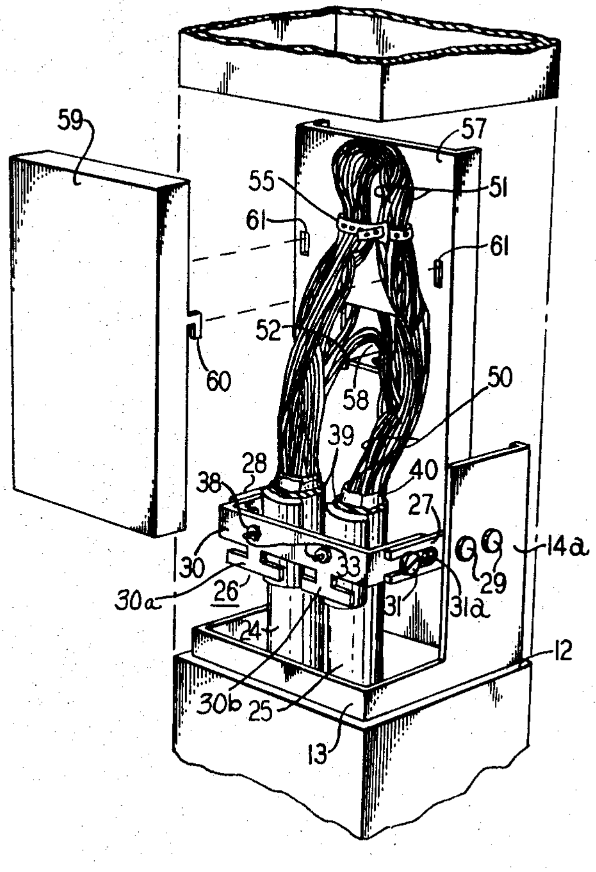
FIG. 4 is a partial side perspective view of one version of the closure interior.
Figure 5:
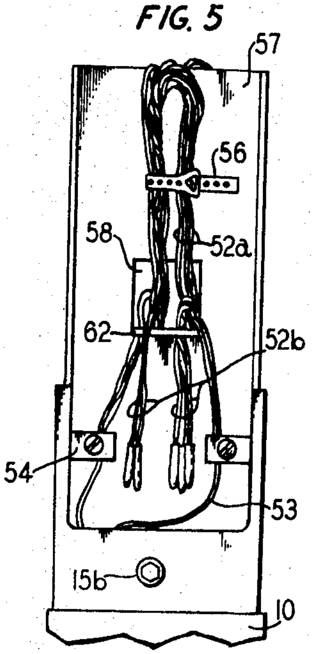
FIG. 5 is an elevation view of the lower portion of the FIG. 4 closure.

Accordingly, FIG. 1 depicts a closure, embodying the present invention in place in the ground and consisting of a base 10 and an upper housing 11 which advantageously is of the bell jar type. These members are cross sectionally similar so that the bottom edge of upper housing 11 engages the circumferential lip 12 of base 10, as shown in FIG. 4. Extending from lip 12 is a flange 13 which is relatively short in its frontal aspect, but in the rear is elongated into flange extensions **14*a*, 14*b*, best shown in FIG. 8. A frontal extension of flange 13, also seen in FIG. 8, supports a locking nut 15*a*; and as seen in FIG. 5, a similar locking nut 15*b* is supported in the opposite side of base 10. Locking nuts 15*a*, 15*b* engage keyways 16 in upper housing 11, one of which is shown in FIG. 1. In this fashion, upper housing 11 is removably secured in two places to base 10** to maintain a rigid nonrocking relationship between the two.

Figure 2:
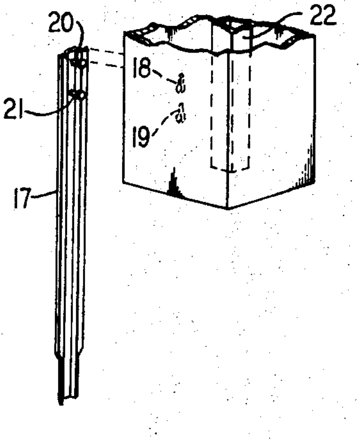
FIG. 2 is an exploded side perspective view of the closure base and a mounting stake.
Figure 9:
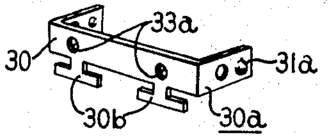

As seen in FIGS. 1 and 2, base 10 is mounted on a post 17 and when so mounted extends somewhat below ground level. Two keyhole-shaped holes 18, 19 in base 10, are engaged by devices 20, 21 which can be a pair of clinch nuts and bolts threadably mounted in post 17. As in the aforementioned patent application, the post 17 is first driven into the ground alone and thereafter the bolts 20, 21 are maneuvered into the holes 18, 19 until the bolts and the keyholes are engaged. Thereafter, the bolts are tightened from the inside of the base 10 to complete the fastening.

Figure 8:
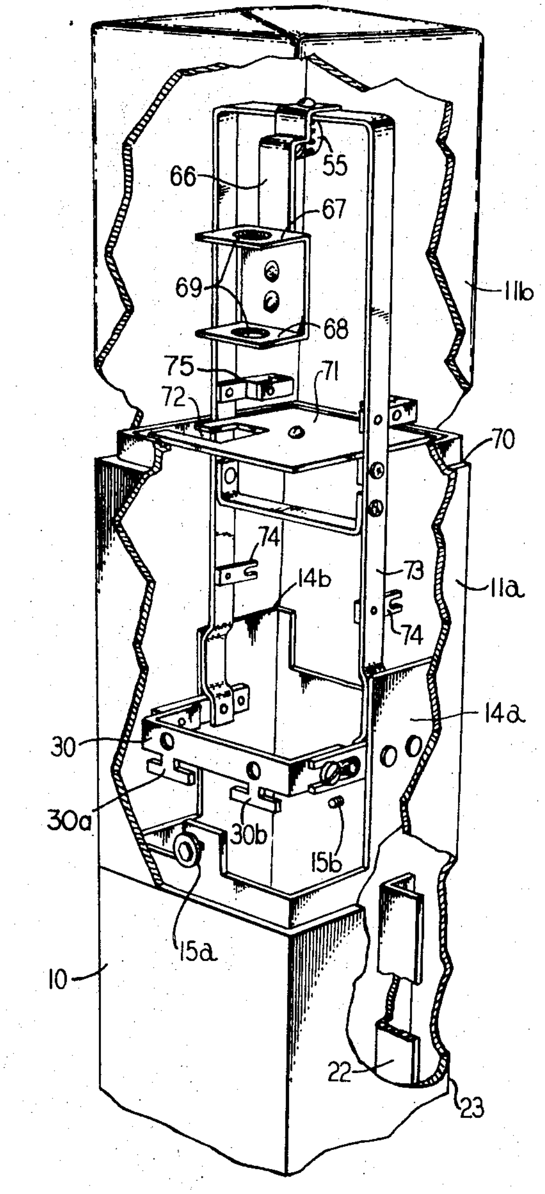
FIG. 8 is a side perspective view of a closure housing utilizing a third species of internal bracketing.

Also as in the preceding patent application, an L-shaped channel 22 is fastened along the vertical back corner 23 of base 10 as is depicted in FIG. 2 and FIG. 8. A run for service wires from the splicing area of base 10 down to the bottom of base 10 thus is afforded, the advantage of which is to avoid having to clear out the fill or ballast within base 10 for the purpose of running service wires at some later time.

Pursuant to one facet of the invention, fastening of the cable legs 24, 25 within base 10 is afforded through the bracket and clamp assembly 26, depicted in FIG. 4. A pair of slotted arms 27, 28 mounted on flange extensions **14*a*, 14*b* respectively by some means such as rivets 29, provides support for a U-shaped bracket 30. Bolt 31 and projection 31*a* accommodate to the slotted arms 27, 28 and provide sliding horizontal adjustment for the bracket and clamp assembly 26**.

Two downwardly extending inverted T-members **30*a*, 30*b*** are provided to secure conventional hose-type clamps (not shown) which grip the exposed inner cable sheath for grounding and mechanical support.

Figure 3:
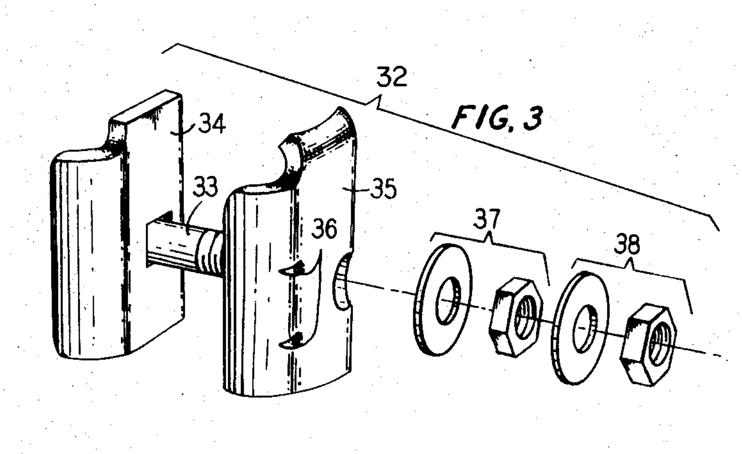
FIG. 3 is an exploded side perspective view of a cable bonding and anchoring clamp.

The outer jacket 39 and the inner aluminum shield 40 are removed from a section of the cable legs 24, 25. Then, the bonding clamp assembly 32, depicted in FIG. 3 is installed through a slit in the outer jacket 39 and the shield 40. The inner clamp 34 is slipped into the cable interior and the bolt 33 is engaged through the slit. Thereafter, the outer clamp 35 is placed onto bolt 33, and the washer and nut 37 are tightened. The tangs 36 of clamp 35 grip the outer jacket 39. The bolt 33 then is fed through one of the holes **33*a* in U-bracket 30, and finally the washer and nut assembly 38 is engaged to bolt 33 and tightened down. The resulting electrical and mechanical anchoring of the cable legs 24, 25 to the bracket 30 provides strong grounding and support for the cable legs. A routine application of vinyl tape (not shown) then is applied around the cable pairs 50**.

In accordance with a further aspect of the invention, a partition 57 is mounted as with rivets 29 and the flange extensions **14*a*, 14*b*. Partition 57 is mounted vertically in a plane that is off-center with respect to the base 10. Partition 57 has a central window 58. The cable pairs 50, which comprise the entire count of the cable leg 25 are divided into two groups. Those pairs which will either remain unspliced or which will form a distribution splice are disposed on the near side of partition 57 and there held down by the cable tie 55. These pairs are designated 51. The remaining pairs 52, which form the count, are fed through window 58 and as seen in FIG. 5 are secured in a loop arrangement by the cable tie 56**.

The preferred count pairs 52 are those specified by the telephone engineer as the only pairs available at a given closure for terminating service drops. Typically, the preferred count is twenty-five or fewer pairs. Thus, with existing color-code schemes, the segregating of a preferred count on one side of a partition 57, in accordance with one aspect of this invention, precludes the installer from confusing pairs of the same color code and further greatly reduces his searching time for a given telephone pair.

Moreover, as shown in FIG. 5, a further housekeeping feature involves physically separating the pairs **52*a* of the preferred count 52, namely those that are presently unused for splicing, and the pairs 52*b* of the preferred count 52, which, as shown, are spliced to service wires 53. As time passes and further service splices are required, appropriate cable pairs of the unused group 52*a* are removed from the loop in which they are bound by cable tie 56, spliced, and thereafter disposed in the ring fixture 62**.

The spliced service drops, shown in FIG. 5, are each supported in an assembly such as 54 which is a mounting and grounding connector that effects grounding connection with the sheath of service wires 53. The latter thereafter are led down through channel 22 and onto the installation being served.

It is seen in FIG. 5 that a substantial loop of telephone pairs is provided on either side of partition 57. This is to make available enough copper in each conductor pair to withdraw several splicings.

The internal hardware just described and depicted in FIG. 4 is further enhanced by the provision of a shield 59 secured on the near side of partition 57 by engagement of slots 61 with arms 60. Shield 59 when fastened to partition 57 is added assurance that an installer will stay clear of the distribution pairs which are not intended for service drops from the closure in question. The closure of FIG. 4 thus is used at loop-through locations where advantageously only service wires are to be terminated.

There is occasional need at loop-through locations for the provision of protector blocks which guard against extraneously introduced current and voltage surges. For this requirement, the additional bracketing depicted in FIG. 6 and consisting of U-shaped bracket 63 with slots 65, is mounted at top of partition 57 in the manner shown. Protector blocks 64 then are mounted in slots 65 with appropriate hardware. The use of bracket 63 of course requires a longer upper housing 11, but one that is in all other respects identical to that depicted in FIG. 1. The bracket 63 also supports connector assemblies 54 whose function has already been described.

Figure 6:
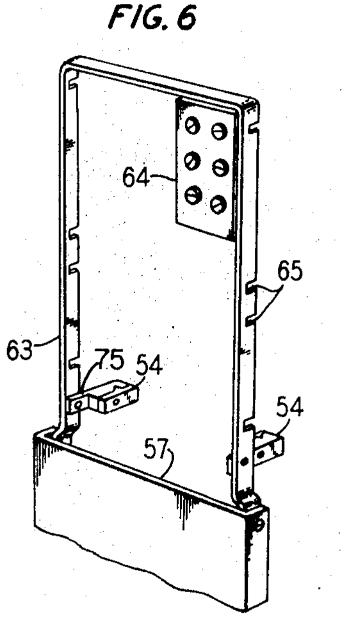
FIG. 6 is a frontal perspective of a further type of bracket mountable on the bracketing shown in FIG. 4.
Figure 7:
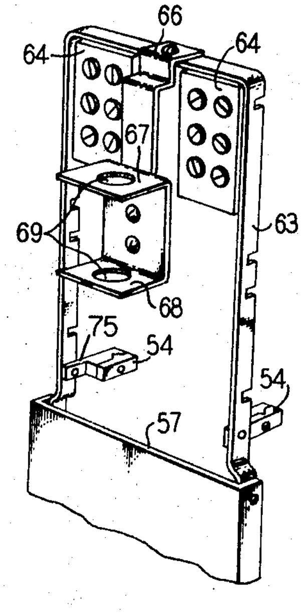
FIG. 7 is a frontal perspective view of a still type of bracket.

A further variation of the bracketing arrangement depicted in FIG. 6 is shown in FIG. 7. There, a wire support 66 which comprises arms 67, 68 each having a slotted housekeeping loop 69, is connected to the top of the U-shaped bracket 63. The loops 69 are for the purpose of supporting conductor pairs in orderly fashion, by insertion of the pairs through the slots. Support 66 advantageously is a nylon-coated metal stamping.

At closure locations where a distribution splice is required as well as the termination of service wires, the interior hardware depicted in FIG. 8 is advantageous. The interior hardware consists of an elongated U-shaped bracket 73 supporting the bracket 30, which as in FIG. 4 supports the bracket and clamp assembly 26 (not shown in FIG. 8). If protector blocks such as 64 are needed and if, further, the cable is ended at this closure or a bridge cable is necessary, then the cable splice is made in the bottom chamber defined within the undersection **11*a* of housing 11. Then, in a manner similar to that depicted in FIGS. 4 and 5, a preferred cable count is fed or bridged to the space defined within the top section 11*b*. Housing sections 11*a* and 11*b* are both similar in cross section to the base 10, and mount atop one another by the engagement of the bottom edge of top section 11*b* onto the lip 70 of undersection 11*a***.

The partition 71 in the embodiment of FIG. 8 is horizontally mounted at the juncture between the undersection **11*a* and the housing top section 11*b*. Partition 71 serves the additional function of helping to hold undersection 11*a* in place by virtue of the overlapping edges as shown. The preferred count (not shown) is led through window 72, and is secured by cable tie 55 from which suitable ones of the preferred count are spliced to service drops. The splices are supported by the wire support 66 which is similar to that shown in FIG. 7. Bracket 73 advantageously includes extensions 74 disposed in the section 11***a*, for supporting branch cables where necessary. Extensions 75 of bracket 73 mount connector assemblies such as 54.

In summary, a family of buried telephone cable pedestal closures have been described which differ internally in accordance with their intended use. Each is equipped with housekeeping aids to establish separate compartments for splicing and distribution. Advantageously, approximately six service wires and a maximum 200-pair splice with a 50-pair bridge is acommodated in the appropriate closure. Cable bonding, loop length, and internal hardware are largely standardized in all the closures to simplify enclosure installation.

The spirit of the invention is embraced in the claims to follow.

What is claimed is:

1. A pedestal closure for telephone cable comprising:
a four-sided open-ended base;
an upper housing of like cross section and closed at its top;
means removably securing said upper housing to said base;
a cable-mounting bracket connected across the upper interior of said base;
means mechanically clamping a telephone cable to said cable-mounting bracket and electrically connecting a metallic sheath of said cable to said bracket;
a partition disposed in said upper housing and defining two separate compartments therein, said partition including a window;
a first group of wire pairs destined for splicing with service wires being led through said window;
means connected to said partition for mounting said first group on the far side of said partition; and
means connected to said partition for mounting on the near side of said partition a second group of wire pairs comprising substantially the remainder of the pair count in said cable.

2. A pedestal closure in accordance with claim 1, further comprising means mounting said partition vertically and off-center from said base,
means including a cable tie fastened on said partition near side above said window for detachably securing said second wire group; and
means including a second cable tie connected above said window on said partition far side for removably securing the members of said first wire group.

3. A pedestal closure in accordance with claim 2, further comprising a shielding enclosure substantially coextensive in width with said partition and means securing said enclosure on said partition near side to substantially conceal said second wire group.

4. A pedestal closure in accordance with claim 1, wherein said upper housing comprises an open-ended undersection in engagement with said base, and a top section closed at its top and engaging the upper edge of said undersection; and
means mounting said partition horizontally at the juncture between said undersection and said top section of said upper housing.

5. Apparatus in accordance with claim 4, further comprising an elongated inverted U-shaped bracket connected to said base and extending vertically upwardly through said undersection and through said top section, means connecting said partition to the legs of said bracket, and a wire support connected to the top of said bracket and comprising a unitary metallic stamping including a plurality of arm pairs, each arm pair including a closed loop for receiving and securing members of said first wire group.

6. In combination, a pedestal closure comprising:
a four-sided open-end base comprising an inwardly extending circumferential lip along the upper edge thereof and a pair of opposite flange side extensions extending upwardly from the rear of said lip;
an upper housing having a cross section like said base and a closed top, said upper housing lowermost edge engaging said base lip;
means removably securing said upper housing to said base;
a cable-mounting bracket comprising a pair of horizontal slotted arms respectively connected to said flange extensions, a U-shaped bracket including means engaging the said slots on respective legs of said bracket;
a telephone cable comprising multiple wire pairs jacketed in an inner metallic sheath and an outer plastic sheath;
first and second plates straddled respectively on said inner metallic sheath and said outer plastic sheath, means including a bolt extending outwardly from said second plate and through said first plate for effecting gripping relation between said plates; and means engaging said bolt to said U-shaped bracket;
a partition in said upper housing defining two separate compartments therein, said partition including a window;
a first group of wire pairs destined for splicing with service wires being led through said window;
means for mounting said first group on the far side of said partition; and
means connected to said partition for mounting on the near side of said partition a second group of wire pairs comprising substantially the remainder of the pair count in said cable.

7. A cable closure comprising a lower housing, a bell jar type upper housing connected thereto, a vertical central divider in said upper housing including at least one window, a multipair communications cable being led through said lower housing, means for fastening said cable to a first side of said divider, a shield for enclosing said cable in the vicinity of said divider, and means connected to the second side of said divider for supporting selected cable pairs led through said window.

References Cited

UNITED STATES PATENTS

| | | | |
|---|---|---|---|
| 3,180,920 | 4/1965 | Fletcher et al. | 174—38 |
| 3,268,651 | 9/1966 | Stevenson | 174—38 |
| 3,283,059 | 11/1966 | Plummer | 174—38 |
| 3,309,456 | 3/1967 | Connell | 174—38 |

LARAMIE E. ASKIN, Primary Examiner

U.S. Cl. X.R.

174—60